United States Patent [19]

Hill

[11] Patent Number: 5,160,218

[45] Date of Patent: Nov. 3, 1992

[54] IN-GROUND SECUREMENT OF PIPELINES AND THE LIKE

[75] Inventor: Michael F. Hill, Calgary, Canada

[73] Assignee: Nova Corporation of Alberta, Calgary, Canada

[21] Appl. No.: 608,680

[22] Filed: Nov. 5, 1990

[51] Int. Cl.$^5$ ............................................. F16L 1/00
[52] U.S. Cl. ................................. 405/154; 405/157; 405/172
[58] Field of Search ............... 405/157, 154, 158, 159, 405/172

[56] References Cited

U.S. PATENT DOCUMENTS

| | | |
|---|---|---|
| 687,389 | 11/1901 | Wilhelmi . |
| 3,479,830 | 11/1969 | Ostarly ................... 405/172 |
| 3,675,432 | 7/1972 | Keene . |
| 3,793,845 | 2/1974 | Keith . |
| 3,841,105 | 10/1974 | Cannon ................... 405/172 |
| 3,903,704 | 9/1975 | Spiridonov . |
| 3,993,192 | 11/1976 | Bunn ................... 405/157 X |
| 4,126,012 | 11/1978 | Waller ................... 405/157 |
| 4,166,710 | 9/1979 | Spiridonov ................... 405/172 |
| 4,242,010 | 12/1980 | Gjerde et al. ................... 405/157 |
| 4,338,045 | 7/1982 | Cour ................... 405/172 |
| 4,477,206 | 10/1984 | Papetti et al. ................... 405/172 |
| 4,480,943 | 11/1984 | Leuenberger ................... 405/172 |
| 4,913,588 | 4/1990 | Vilnes ................... 405/157 |

FOREIGN PATENT DOCUMENTS

| | | |
|---|---|---|
| 6996 | 1/1977 | Japan ................... 405/157 |
| 155832 | 12/1980 | Japan ................... 405/172 |
| 1041789 | 9/1983 | U.S.S.R. . |
| 1092322 | 5/1984 | U.S.S.R. . |
| 1268860 | 11/1986 | U.S.S.R. . |
| 1314177 | 5/1987 | U.S.S.R. . |
| 1348599 | 10/1987 | U.S.S.R. ................... 405/172 |
| 1399846 | 5/1988 | U.S.S.R. ................... 405/157 |

Primary Examiner—Randolph A. Reese
Assistant Examiner—John Ricci
Attorney, Agent, or Firm—Sim & McBurney

[57] ABSTRACT

Pipelines are maintained in subterranean location by a plurality of weighting devices which include an elongate central raised region enclosing the pipeline and generally planar flanges extending outwardly from the central raised region in a common plane. Backfill overlaying the flanges provides an increased resistance to upward movement of the buried pipeline under the influence of an encompassing fluid medium or other force.

8 Claims, 3 Drawing Sheets

FIG.1.
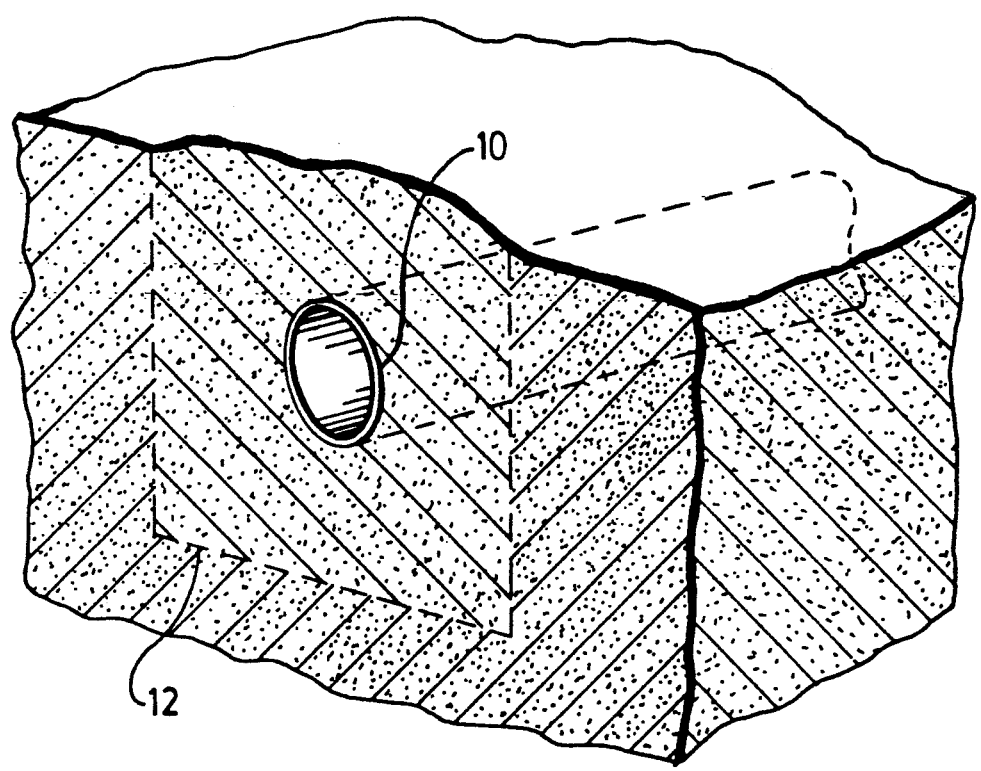
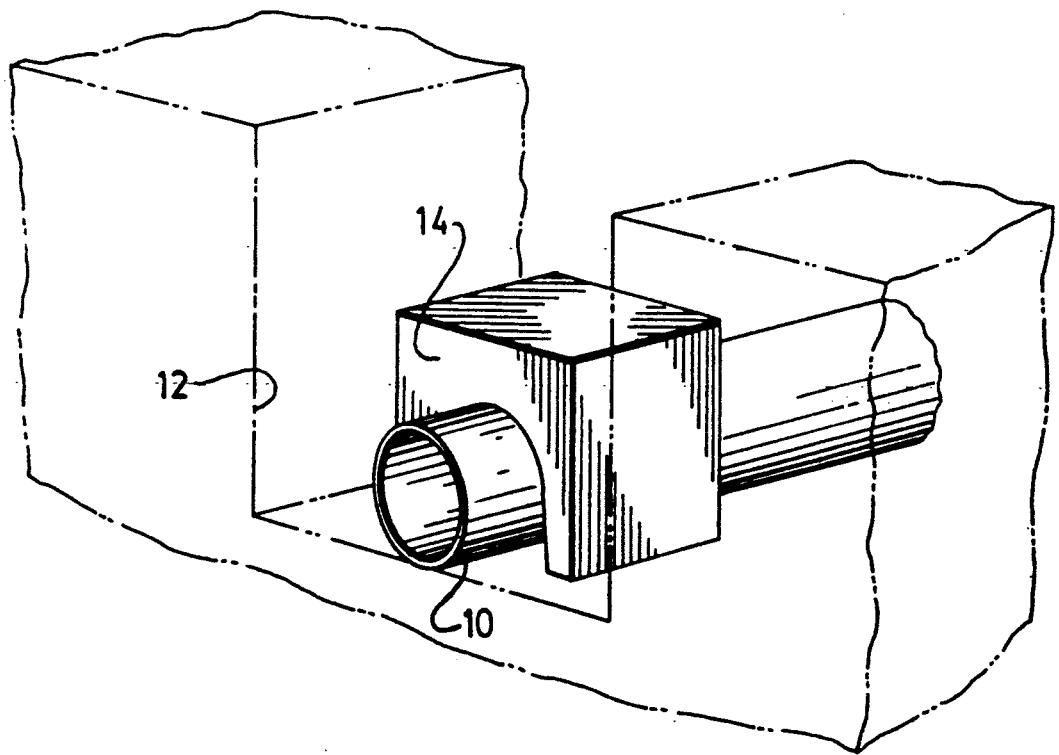
FIG.2.
PRIOR ART

FIG. 3.
PRIOR ART
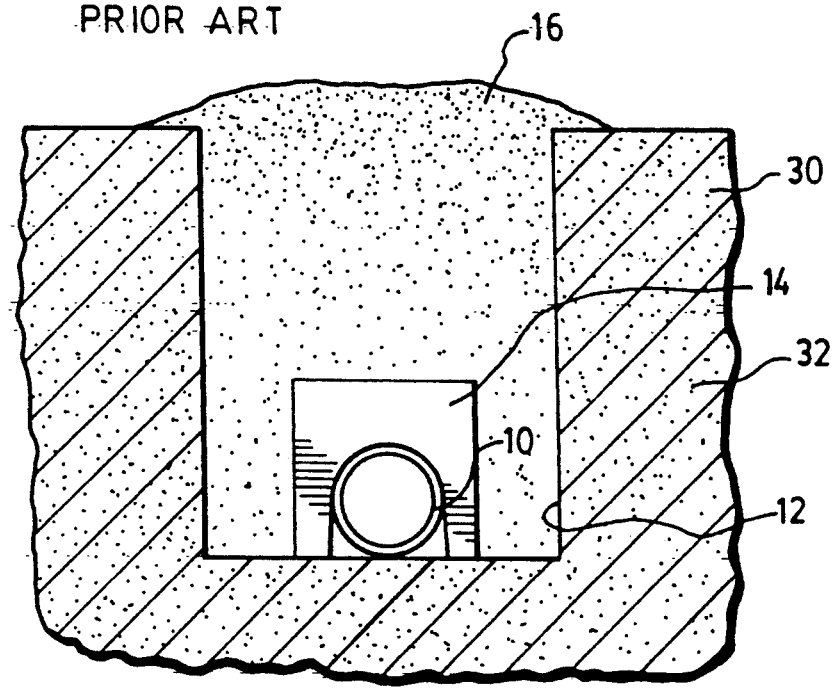
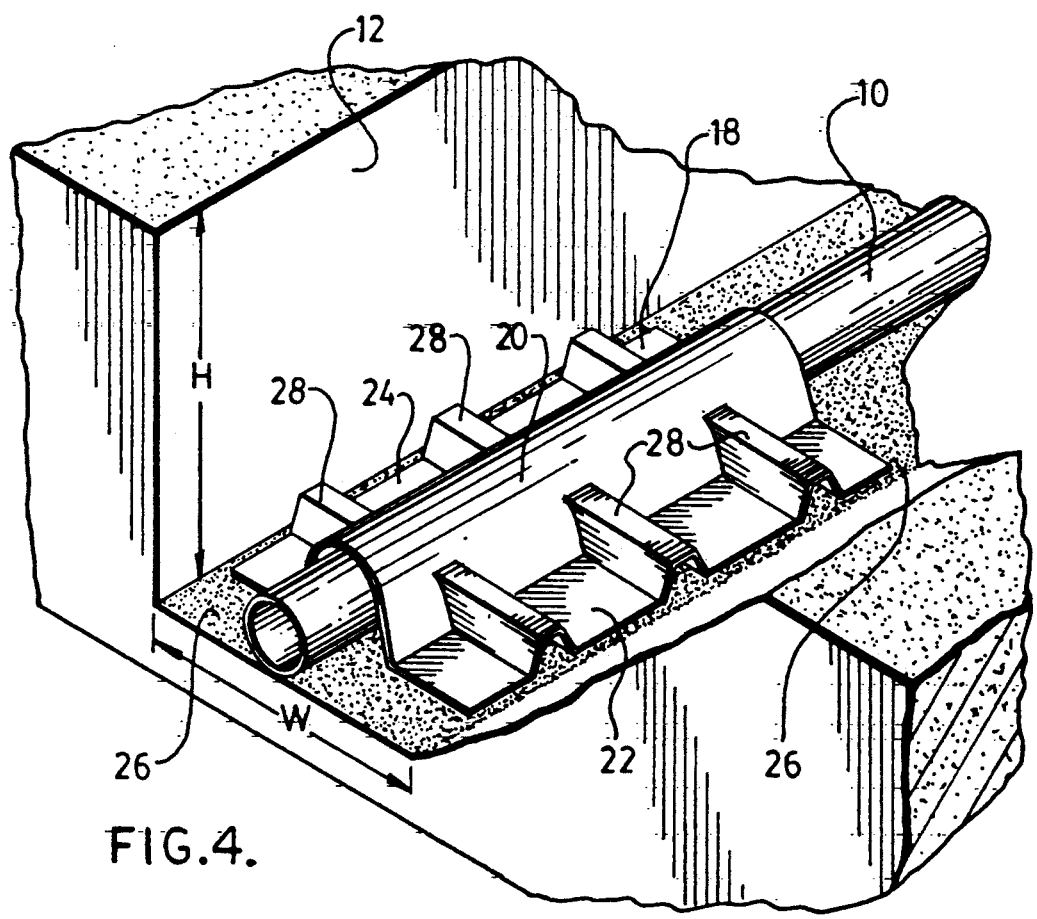
FIG. 4.

VERTICAL SLIP SURFACE MODEL FOR A PIPELINE

VERTICAL SLIP SURFACE MODEL FOR A PLATE WEIGHT

IN-GROUND SECUREMENT OF PIPELINES AND THE LIKE

FIELD OF INVENTION

The present invention relates to the locating and securing of a pipeline and other devices in a subterranean location using weighting devices of novel construction.

BACKGROUND TO THE INVENTION

Pipelines for the transportation of fluids, such as natural gas, petroleum products or water, are often buried underground for a significant distance in a variety of terrains. Usually, a ditch is dug in the terrain, the pipeline laid in the ditch and the ditch and pipeline backfilled with the material dug out to form the ditch.

The pipeline is intended to remain buried for a significant period of time. This requirement can be a problem, particularly when traversing low lying areas subject to inundation by water, such as muskeg terrain. The buoyancy effect produced by the fluid medium encompassing the pipeline in such areas tends to shift the position of the pipeline towards the surface with the potential for the pipeline to eventually break through the surface. For this reason, concrete weights of various designs have been traditionally placed at intervals along the ditch to resist the buoyancy force on the pipeline caused by the water or other encompassing fluid medium and to maintain the pipeline in a buried condition.

These concrete weights are expensive to manufacture and transport to the often remote locations of use. However, they are employed in the absence of a viable alternative. The present invention is directed towards providing such an alternative.

The applicants are aware of a variety of prior patents relating to pipeline anchoring arrangements, some to maintain the pipeline submerged in an aqueous environment, such as a seabed, and some to maintain the pipeline buried in-ground, as follows:

U.S. Pat. Nos. 687,389, 4,166,710, USSR 1,041,789,
U.S. Pat. Nos. 3,675,432, 4,242,010, USSR 1,092,322,
U.S. Pat. Nos. 3,793,845, 4,338,045, USSR 1,268,860,
U.S. Pat. Nos. 3,903,704, 4,477,206, USSR 1,314,177,
U.S. Pat. No. 4,126,012. None of this prior art described or suggests the relatively simple form of weighting device provided herein.

SUMMARY OF INVENTION

The present invention provides a novel weighting device for assisting in maintaining a pipeline in a subterranean environment, where restraint or anchorage is required, such as in low lying areas subject to inundation with water or at pipeline overbends, where thermally-induced elongation may cause the pipe to move upwards.

The weighting device of the present invention comprises an elongate rigid body, which may be integrally formed of rigid reinforced polymeric material, having a central longitudinally-extending raised region shaped to receive the cross-selectional dimension of said fluid-enclosing device wholly therewithin, and having generally planar flanges directed outwardly from each side of said central raised region in a common plane.

When a pipeline is laid and the weighting devices of the invention are employed, a ditch first is dug which is wider than the pipeline and at least as wide as the weighting device. A plurality of the weighting devices are laid over the pipeline at predetermined longitudinally-spaced intervals, so that the pipeline is received in the central longitudinally-extending raised region while the flanges lie on the bottom wall or base of the ditch, so that the pipeline is enclosed by the base of the ditch and the central longitudinally-extending raised region of the weighting device. The ditch then is backfilled with suitable backfill material, usually with material previously removed from the ditch.

The backfill material overlies both the pipeline and the weighting devices. The weight and frictional shear force of the backfill material acting on the whole length and width of the weighting device, both directly on top in the area of the central longitudinally-extending central region and to the sides of the pipeline in the area of the outwardly-extending flanges provides a much-increased resistance to upward movement of the pipeline, when compared to the absence of such a weighting device.

The present invention does not rely for its effectiveness on its weight, as in prior art concrete anchoring devices, but rather on the weight of the backfill material acting on the central raised region and the horizontally-extending flanges of the device.

The weighting devices may be readily manufactured, such as by molding or otherwise forming from suitable polymeric material, which usually is non-biodegradable. The weighting devices may be readily transported to the location of use and stored when not in use. The devices may be stacked one on another for such transportation and storage. The weighting devices of the invention, therefore, are advantageous when compared to the conventional concrete weights, and provide a much less costly means of achieving the desired weighting of the pipeline.

While the present invention is particularly directed to and is particularly described with respect to maintaining buried pipelines in their subterranean location, the present invention also is applicable to buried containers and vessels and similar tubular fluid-enclosing devices.

Further, the weighting devices may be used to provide additional pipeline restraint in any direction, provided it is assisted by some form of material. Thus, in addition to uplift restraint, the weighting devices may be used to provide lateral resistance or sinking resistance to a pipeline, if desired.

The devices of the present invention also may be used as effective pipe shielding devices during ditch backfilling operations, particularly in areas where the ditch backfill contains coarse material, in the form of large rocks or frozen lumps, and there is a potential for pipeline denting or coating damage from such material.

BRIEF DESCRIPTION OF DRAWINGS

FIG. 1 is a perspective sectional view showing a pipeline located in a trench rising under the influence of water-induced buoyant forces;

FIGS. 2 and 3 are perspective and end sectional views showing a conventional pipeline concrete weight before and after backfill;

FIG. 4 is a perspective view of a novel pipeline weighting device before backfill;

DESCRIPTION OF PREFERRED EMBODIMENT

Figure 5:
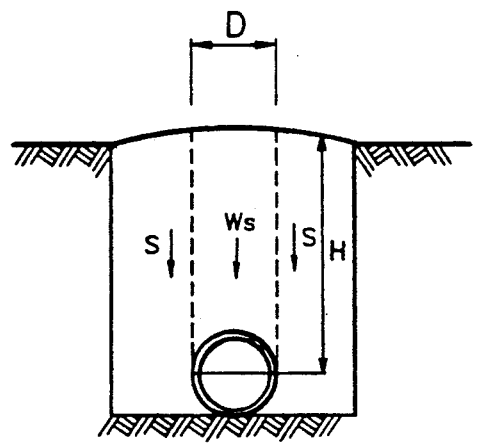
FIGS. 5 and 6 are end sectional force diagrams of a submerged pipeline with and without the novel pipeline weighting device.

Referring to the drawings, FIG. 1 shows the buoyant effect of water levels above the pipeline on the location of a pipeline 10 which is not held in place at the base of a backfilled ditch 12, causing the pipeline to rise in the ditch 12. The pipeline 10 may be designed to carry any of a wide variety of fluids from one location to another, as is well known in the art.

In FIGS. 2 and 3, there is shown a typical concrete weight 14 which is positioned at intervals along the length over the pipeline 10 before the ditch 12 is backfilled. The weights 14 resist upward movement of the pipeline 10 in the ditch 12 when buoyant water forces are encountered.

In FIG. 4, there is illustrated a weighting device 18 provided in accordance with one embodiment of the invention, shown overlying the pipeline 10 lying in ditch 12, prior to backfilling.

The device 18 is of one-piece rigid construction and includes a central elongate raised region 20 dimensioned to accommodate passage of the pipeline therethrough and a pair of generally plane flanges 22 and 24 extending outwardly from the central raised region 20 in a common plane to lie on the base 26 of the ditch 12. The flanges 22, 24 each includes a plurality of upstanding parallel ribs 28 to add structural strength to the device 18. The ribs may extend over the central region 20, if desired.

A plurality of the weighting devices 18 is employed in a novel procedure of laying and locating a pipeline in a submerged location. The ditch 12 first is dug in the earth of a length as desired for the pipeline 10.

The material dug from the ditch is intended to be used as the backfill for the ditch after the pipeline has been positioned in the ditch. In the event that the material dug from the ditch does not have sufficient weight and/or strength, it may be necessary to import backfill material.

The depth H of the ditch 12 from the ground surface to the bottom wall 26 exceeds the diameter of the pipeline 10, so that the pipeline 10 will be submerged following backfilling. For regulatory and backfill weight reasons, the depth of the ditch 12 is dug so that the top of the pipeline is submerged generally to a depth of about 0.8 to 1.3 m.

The ditch 12 also has a width W between sidewalls 34, 36 which significantly exceeds the diameter of the pipeline 10, for reasons which will become apparent below, and to some extent, is dictated by the density of the backfill material.

The pipeline 10 next is positioned by any convenient pipeline laying technique on the base 22 of the ditch 12 generally approximately equidistantly between the sidewalls 34 and 36.

The next step involves positioning, at predetermined intervals along the length of the pipeline 10, a plurality of the weighting devices 18, so that the raised portion 20 overlies the pipeline 10 and the flange portions 22 and 24 lie on the base 26 of the ditch 12, as seen in FIG. 4.

The width and length of the weighting device 18 and the number and longitudinal spacing of the weighting devices 18 are dictated by the force application required to be exerted on the pipeline 10. Generally, the weighting devices 18 have a length-to-width ratio of approximately 3:1, depending on the pipeline diameter and weighting properties. In addition, the weighting devices 18 generally have a ratio of width to pipe diameter of approximately 3:1.

The ditch 12 then is refilled with the backfill material, thereby engaging the weighting device 18 across its entire width and along its entire length, as well as the pipeline 10 itself in the regions between the weighting devices 18. Hence, the ditch 12 is filled with backfill 16 except for the pipeline 10.

When the pipeline 10 is buried in a low lying environment subject to inundation, water tends to infill the ditch 12 to a level which is approximately at the ground surface. The water in the ditch tends to apply a buoyancy force to the pipeline. This buoyancy force, which varies with the diameter and thickness of the pipe wall and the weight per unit length of the pipe and its contents, tends to cause the pipeline 10 to rise (see also FIG. 1). However, this force is counteracted by a variety of forces.

Figure 6:
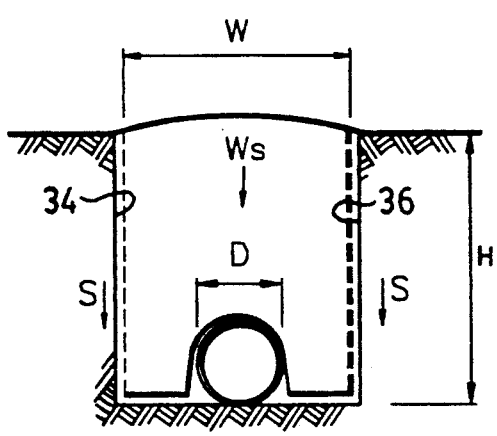

FIGS. 5 and 6 illustrate vertical slip surface models to compute uplift capacity of shallow buried objects. In these models, soil failure is assumed to take place along vertical slip surfaces which extend from the edges of the buried object to the ground surface.

In FIG. 5, there is shown the vertical slip surface model for an ordinary pipe, while, in FIG. 6, there are shown the corresponding slip surface model for the weighting device of the invention. In using this model, soil density and shear strength must be either known or estimated empirically.

As seen in FIG. 5, D is the diameter of the pipeline, H is the depth the pipeline is buried, Ws is the weight of soil acting on the pipeline and S is the shear force of the soil.

The ultimate uplift capacity ($P_u$) is given as follows:

$$P_u = W_s + 2s$$

$$\text{while } W_s = \gamma_s HDL - \gamma \pi D^2 L/8$$

wherein $\gamma s$ is the submerged density and L is the length of pipe, and $$2s = \gamma_s H^2 KL \tan\phi$$

where K is the earth pressure coefficient and $\phi$ is the soil friction angle. Accordingly:

$$P_{upipe} = \gamma_s HDL(1 - \pi D/8H + HK/D \tan\phi) \qquad (1)$$

For FIG. 6,
$$W_s = \gamma_s HWL - \gamma_s D^2 L$$

wherein w is the width of the weighting device, and $$2s = \gamma_s H^2 K(L+W)\tan\phi$$

Accordingly, in this case:

$$P_{uplate} = \gamma_s HWL - \gamma_s D^2 L + \gamma_s H^2 K(L+W)\tan\phi \qquad (2)$$

It is apparent from a comparison of these Figures and from the equations (1) and (2), that the presence of the weighting device considerably increases the resistance of the pipeline to uplift.

The anti-buoyancy forces which act on the pipeline 10 in the present invention contrast with those achievable with a conventional concrete weight 14, where the only forces applied are by the weight 14 and the weight of filler material immediately above the pipeline 10.

In the method of the present invention, therefore, more of the ditch backfill material is employed to resist buoyancy forces than has hitherto been the case. The present invention is much less costly than known systems.

EXAMPLE

Figure 7:
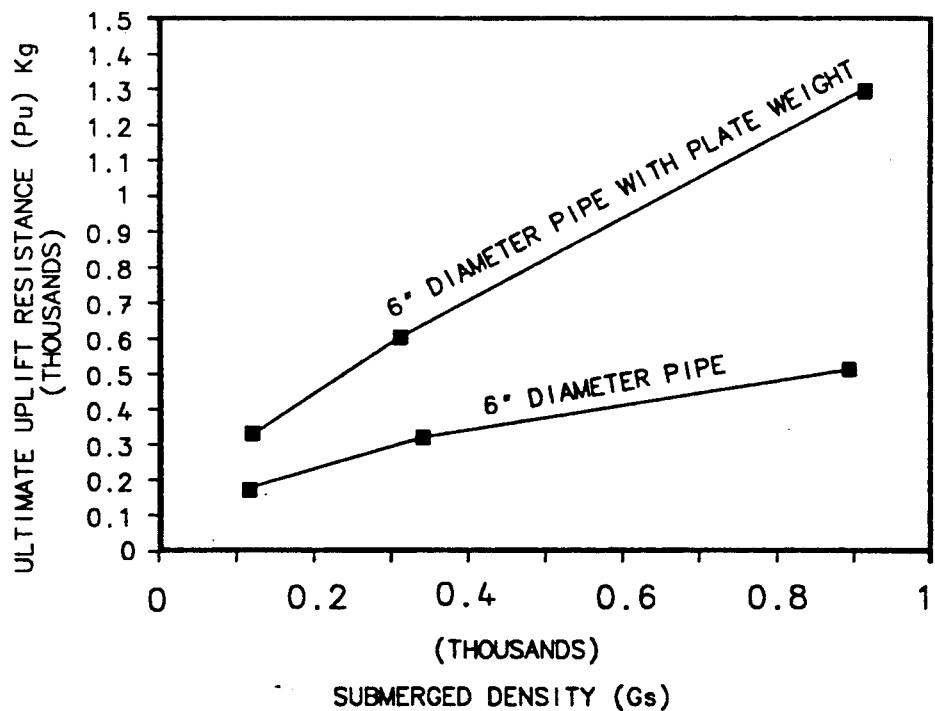
FIG. 7 is a graphical illustration of the effect of the novel pipeline weighting device on the force applied to the pipeline in its submerged environment.

Tests were carried out using the weighting device as illustrated in FIG. 4 as compared with the absence of the weighting device for a six-inch diameter pipe. The ultimate uplift resistance on the pipe for varying backfill density in a subterranean environment was determined and plotted as FIG. 7, for a pipe with and without the weighting device ("plate weight") of the invention. As may be seen, a significantly increased uplift resistance is achieved with the weighting device in place and this increased resistance itself increases further as backfill density increases.

SUMMARY OF DISCLOSURE

In summary of this disclosure, the present invention provides a novel weighting device, as well as a system for ensuring that pipelines and conduits carrying a wide range of products as well as other buried containers and vessels buried in areas subject to inundation, such as swampy or other low lying environments, are maintained in their subterranean location, or in other environments where uplift restraint or anchorage is required. In addition, the novel weighting device may be used to maintain a fluid-enclosing device in any position acted on by external and internal forces. Modifications are possible within the scope of this invention.

What I claim is:

1. A device suitable for assisting in locating and securing a fluid-enclosing device in a subterranean environment, consisting essentially of:
    an elongate rigid body dimensioned so that the length thereof exceeds the width thereof and having a central longitudinally-extending raised region shaped to receive the cross-sectional dimension of said fluid-enclosing device wholly therewithin, and generally planar flanges directed outwardly from each side of said central raised region in a common plane to free longitudinal and lateral edges,
    each of said generally planar flanges having at least one raised rib formed therein between the longitudinal extremities of the flange and extending from the central raised region to the lateral extremity of said flange.
2. The device of claim 1 which is an integrally-formed one-piece element.
3. The device of claim 2 which is formed from polymeric material.
4. The device of claim 3 which is molded from reinforced polymeric material.
5. The device of claim 4 wherein said device has a length to width ratio of approximately 3:1.
6. The device of claim 5 wherein said fluid-enclosing device is a pipeline and said device has a ratio of width to pipeline diameter of approximately 3:1.
7. The device of claim 1 wherein a plurality of said raised ribs is formed in each of said flanges.
8. The device of claim 7 wherein said raised ribs extend through said central region.

* * * * *